United States Patent
Ryu et al.

(10) Patent No.: US 8,243,099 B2
(45) Date of Patent: Aug. 14, 2012

(54) METHOD AND SYSTEM FOR HAPTIC INTERACTION IN AUGMENTED REALITY

(75) Inventors: Jeha Ryu, Gwangju (KR); Beom-Chan Lee, Gwangju (KR); Sun-Uk Hwang, Gwangju (KR); Hyeshin Park, Gwangju (KR); Yong-Gu Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 704 days.

(21) Appl. No.: 12/365,016

(22) Filed: Feb. 3, 2009

(65) Prior Publication Data

US 2009/0195538 A1  Aug. 6, 2009

(30) Foreign Application Priority Data

Feb. 4, 2008  (KR) .................. 10-2008-0011300

(51) Int. Cl.
G09G 5/12 (2006.01)
(52) U.S. Cl. ..................................... 345/632; 340/407.1
(58) Field of Classification Search .................. 345/632; 340/407.1
See application file for complete search history.

(56) References Cited

U.S. PATENT DOCUMENTS

| | | | |
|---|---|---|---|
| 6,270,414 B2 * | 8/2001 | Roelofs ........................... 463/36 |
| 6,329,986 B1 * | 12/2001 | Cheng ........................... 345/419 |
| 6,396,509 B1 * | 5/2002 | Cheng ........................... 715/706 |
| 6,839,663 B1 * | 1/2005 | Temkin et al. ................... 703/13 |
| 6,930,590 B2 * | 8/2005 | Ling et al. ................... 340/407.1 |
| 7,336,266 B2 * | 2/2008 | Hayward et al. ............... 345/179 |
| 7,446,752 B2 * | 11/2008 | Goldenberg et al. .......... 345/156 |
| 7,511,706 B2 * | 3/2009 | Schena ........................... 345/179 |
| 7,592,999 B2 * | 9/2009 | Rosenberg et al. ............ 345/156 |
| 2001/0003712 A1 * | 6/2001 | Roelofs ............................ 463/37 |
| 2007/0035511 A1 * | 2/2007 | Banerjee et al. ............... 345/156 |
| 2008/0010706 A1 * | 1/2008 | Moses et al. ...................... 901/8 |
| 2008/0303782 A1 * | 12/2008 | Grant et al. ..................... 345/156 |
| 2009/0177452 A1 * | 7/2009 | Ullrich et al. .................... 703/11 |
| 2009/0195538 A1 * | 8/2009 | Ryu et al. ........................ 345/419 |
| 2011/0218953 A1 * | 9/2011 | Hale et al. ......................... 706/46 |

FOREIGN PATENT DOCUMENTS

| | | |
|---|---|---|
| JP | 2005535022 A | 11/2005 |
| JP | 2007293412 A | 11/2007 |

OTHER PUBLICATIONS

Julie Yamashita et al., "Haptic 'Smoothness' of Force-Shaded, Polygonized Cylindrical Surface", Transaction of the Virtual Reality Society of Japan, Mar. 31, 2001, pp. 3-9, vol. 6 No. 1, The Virtual Reality Society of Japan.

* cited by examiner

*Primary Examiner* — Javid A Amini

(57) ABSTRACT

The present invention relates to a method and system for haptic interaction in augmented reality that can effectively remove noise from real images captured by an image capturing device and minimize discontinuity of force generated in the haptic interaction for the stable and smooth haptic interaction in the augmented reality. The augmented reality system comprising: a marker detecting unit that detects a markers in images; a marker position extracting unit that extracts the positions of the detected markers; a noise removing unit that removes noise from positional information of the markers; a visual rendering unit that augments virtual objects; a motion estimating unit that estimates the motion of the markers over a time; a collision detecting unit that detects collision between the virtual objects and an end point of the haptic device; and a haptic rendering unit that calculates reaction force to be provided through the haptic device.

18 Claims, 8 Drawing Sheets

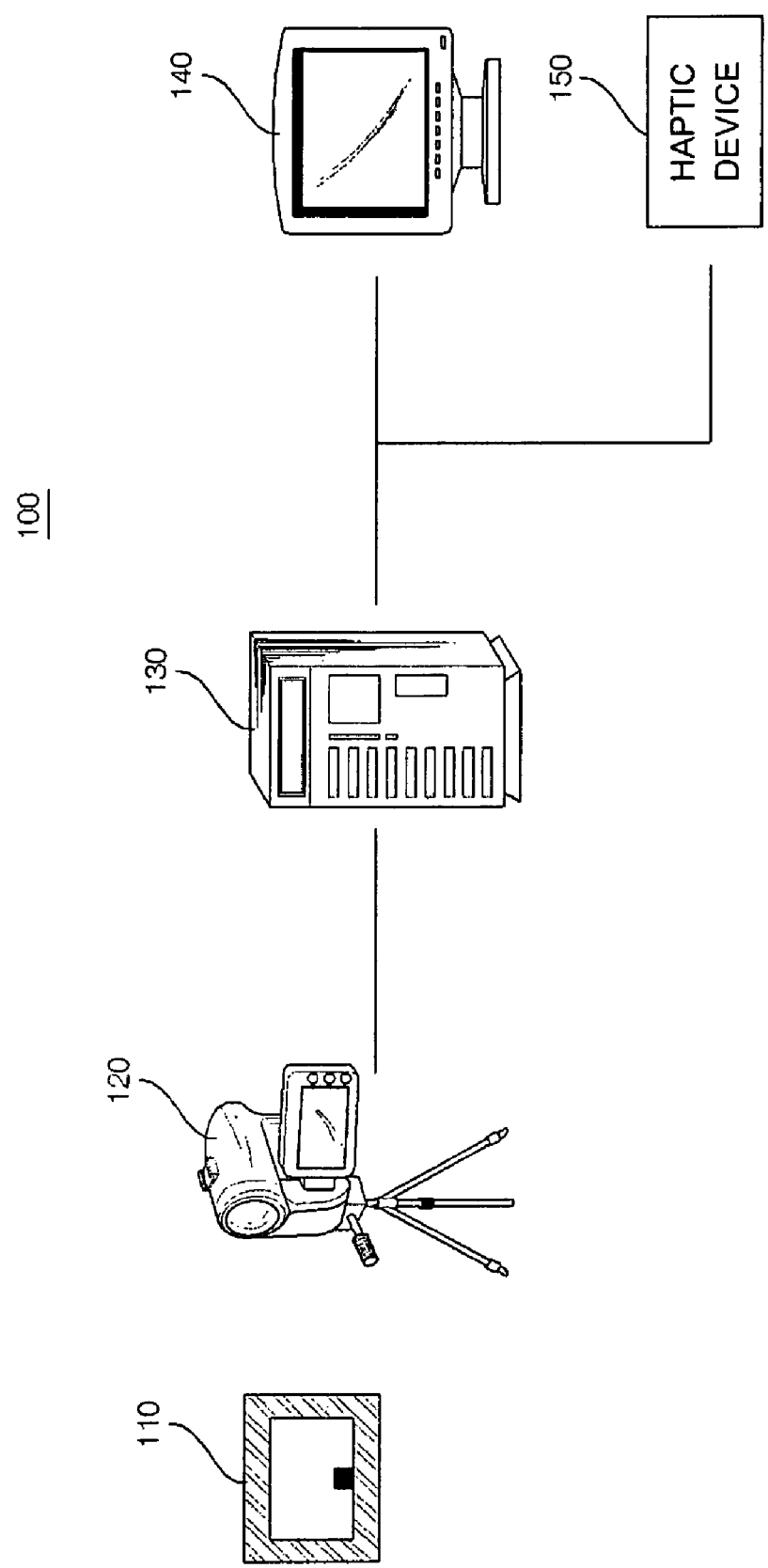

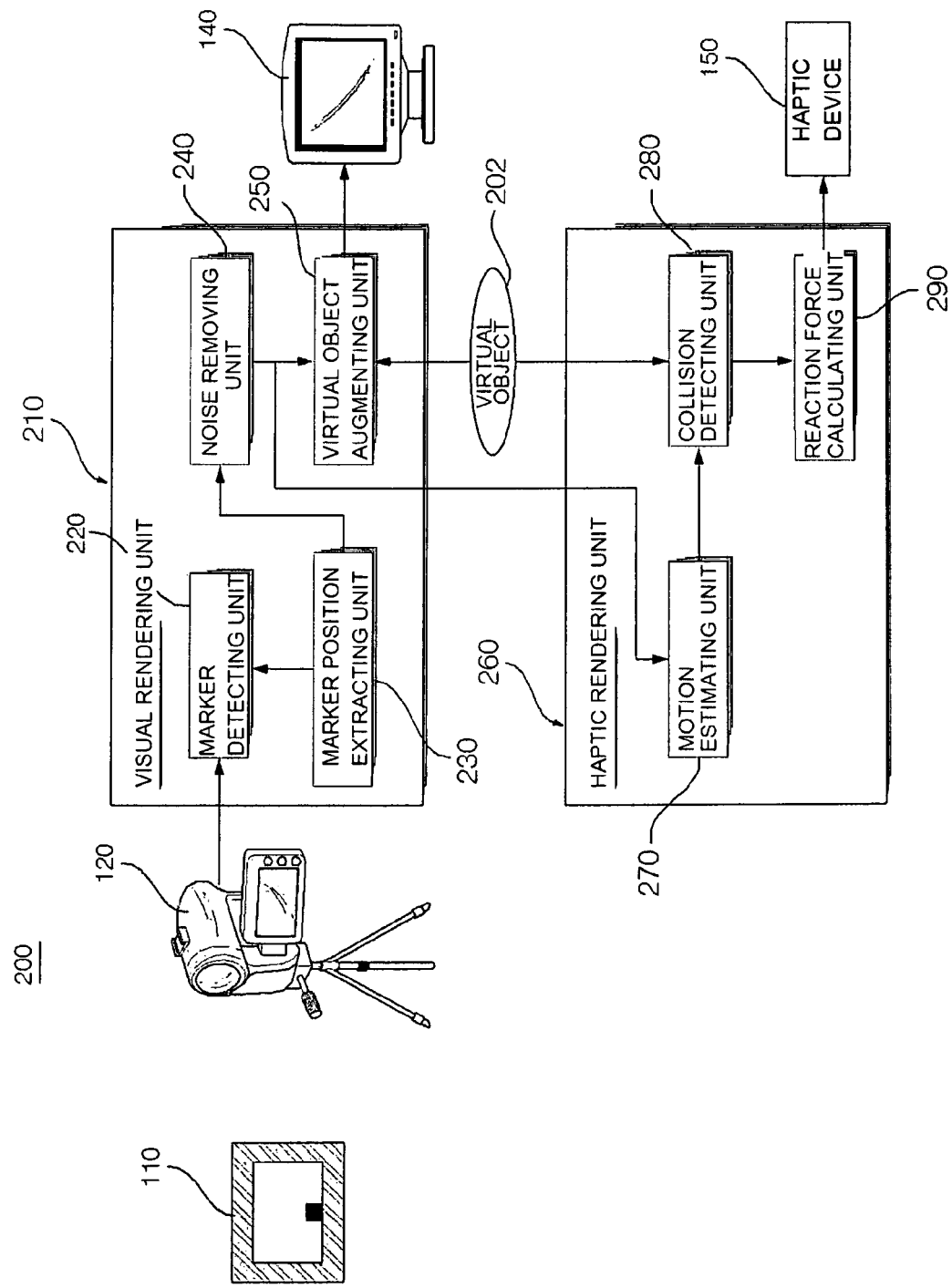
[FIG. 2]

[FIG. 3]
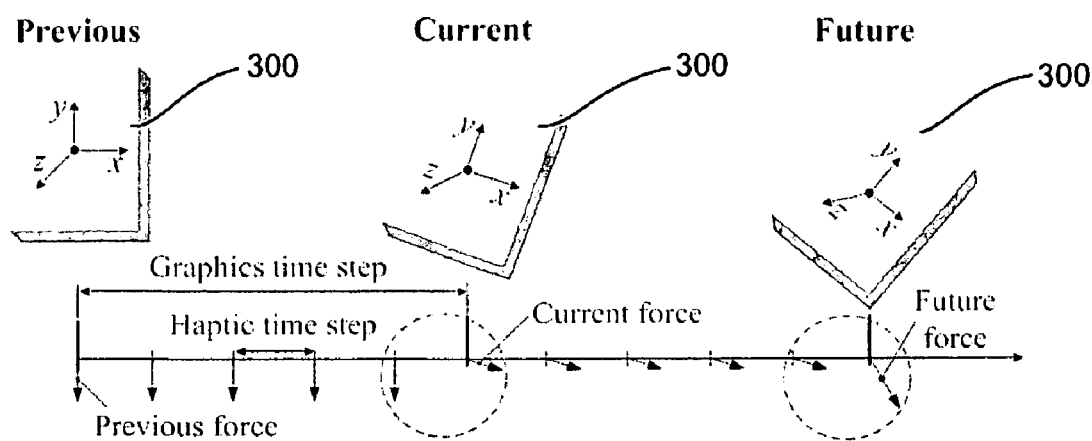

[FIG. 4]
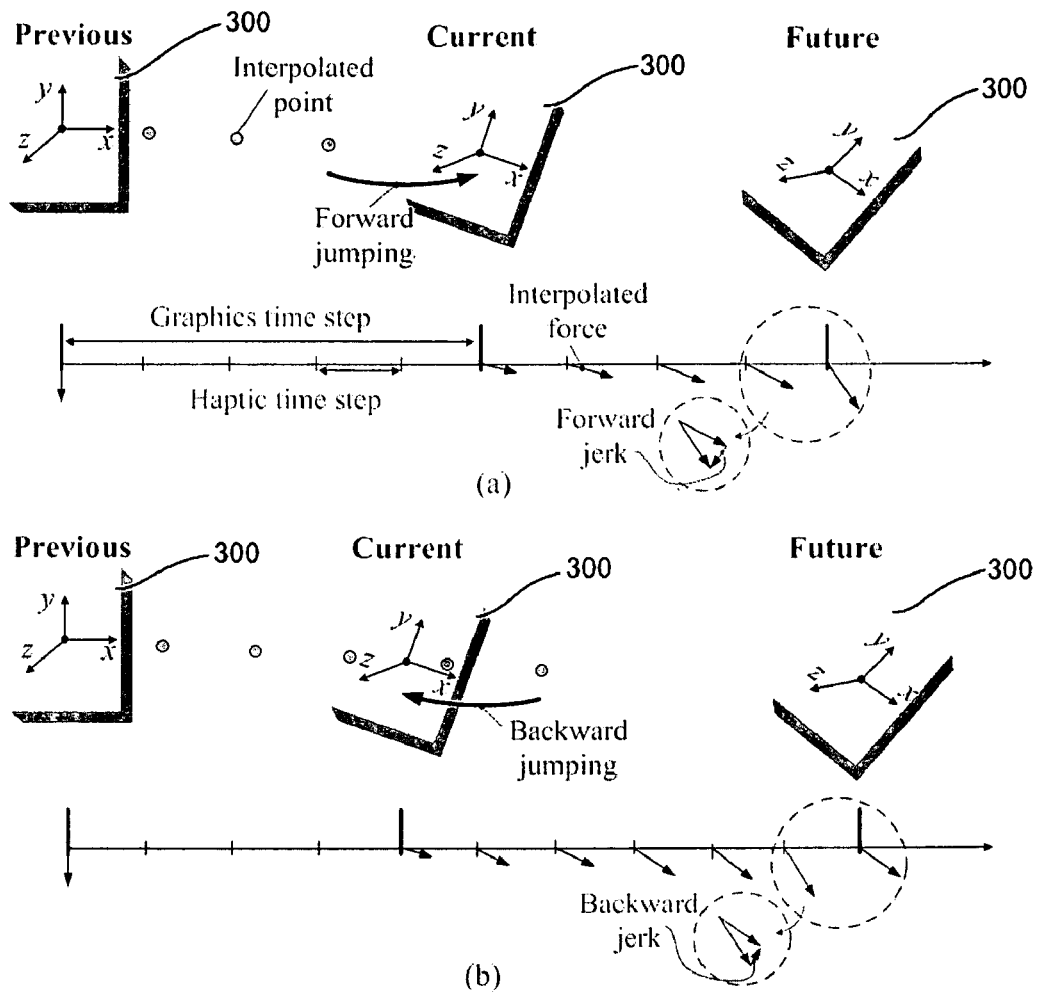

[FIG. 5]
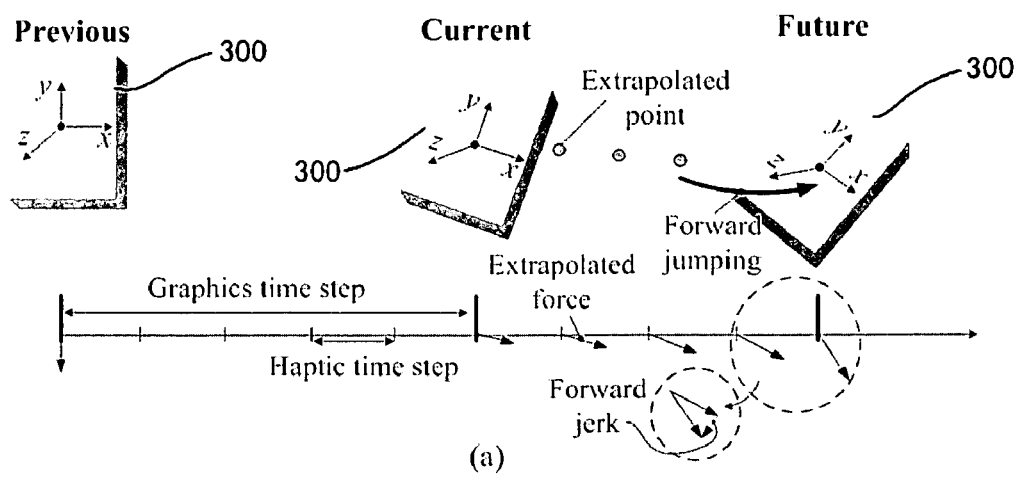
(a)
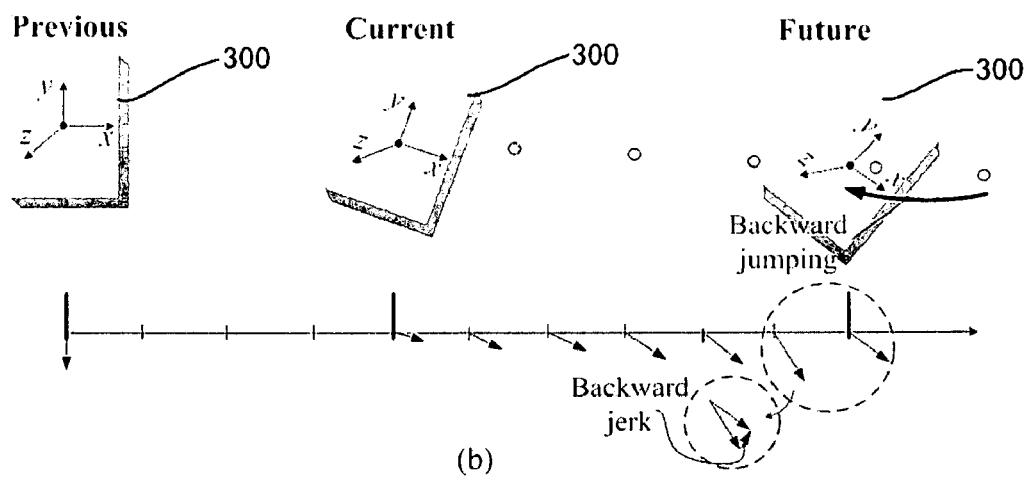
(b)

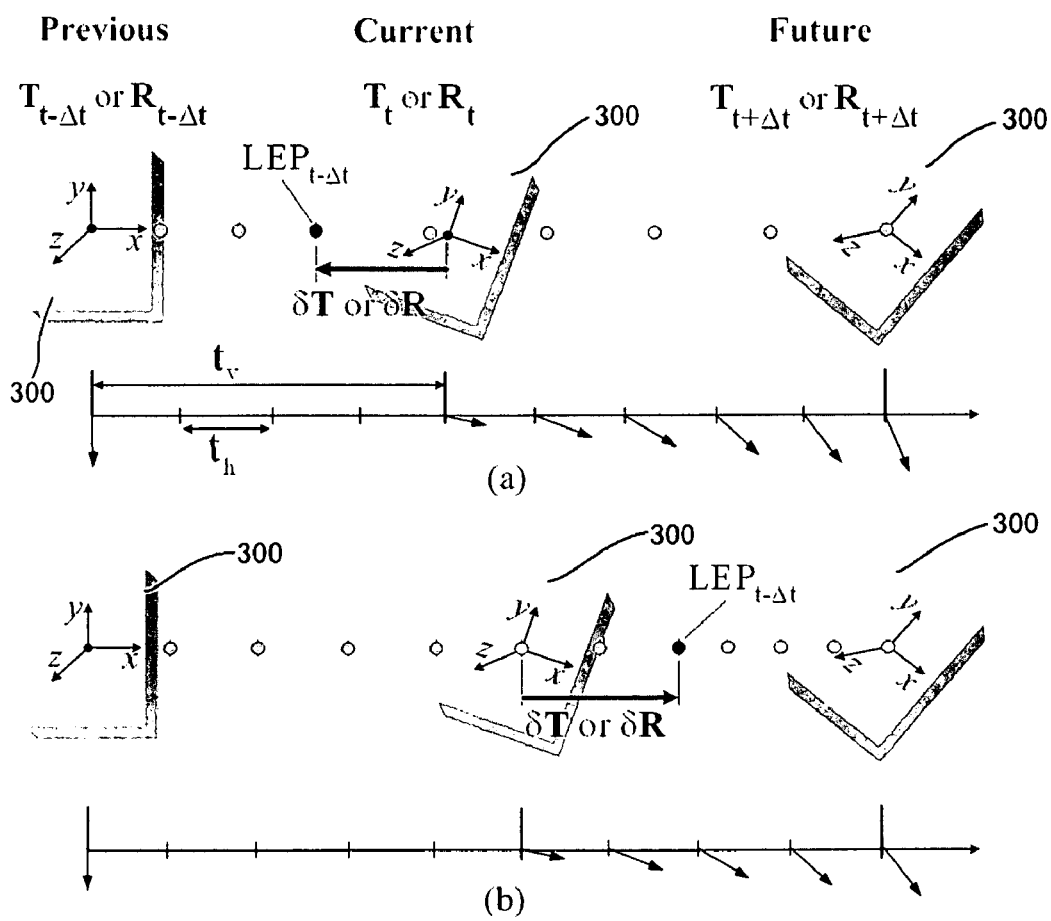
[FIG. 6]

[FIG. 7]
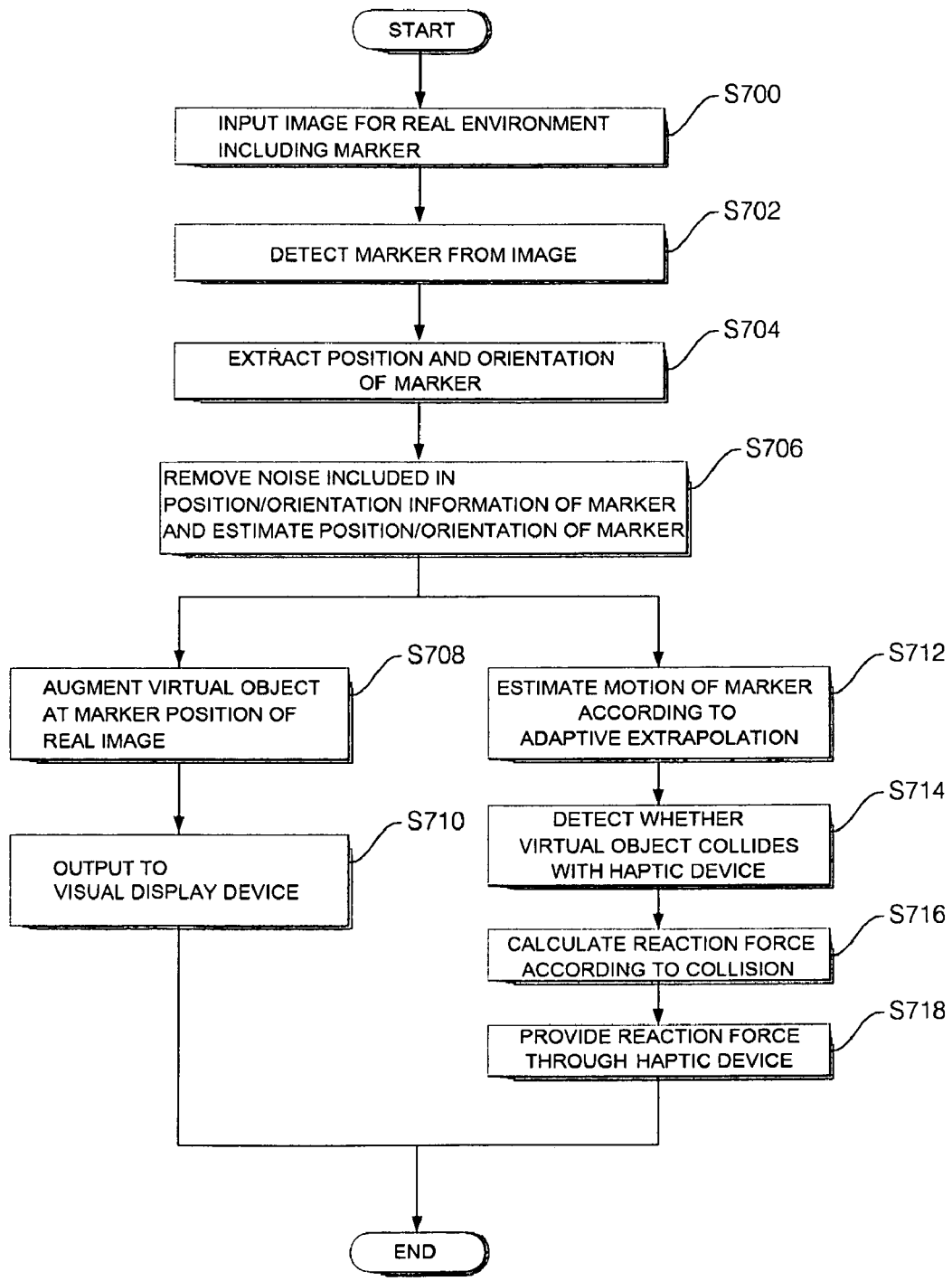

[FIG. 8]
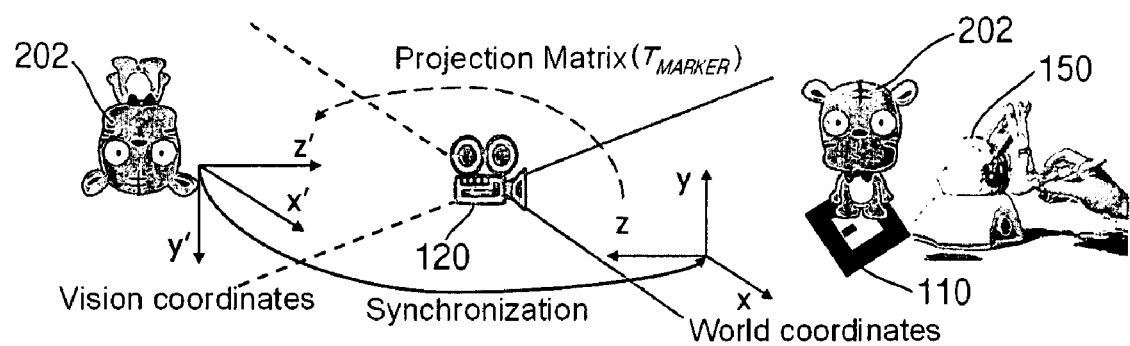

METHOD AND SYSTEM FOR HAPTIC INTERACTION IN AUGMENTED REALITY

BACKGROUND OF THE INVENTION

1. Field of the Invention

The present invention relates to a method and system for haptic interaction in augmented reality. More specifically, the present invention relates to a method and system for haptic interaction in augmented reality that can effectively remove noise from real images captured by an image capturing device and minimize discontinuity of force generated in the haptic interaction so as to stably and smoothly perform the haptic interaction in the augmented reality.

2. Description of the Related Art

Generally, augmented reality (AR) means a technology that helps to display virtual objects as if the virtual objects exist in the same space as a real environment. In other words, the augmented reality is a virtual reality that displays the real world seen through eyes of users and the virtual world with one image having additional information by binding them. A study on the augmented reality has been frequently performed since users interacting within a virtual environment produced by a computer are limited in feeling reality approximately similar to the real environment.

The general AR system mixes images captured from cameras with the virtual objects registered in the virtual environment of the users. Various AR technologies for providing the interaction or the display, which immerses the users in various application fields, such as medical services, military affairs, industries, educations, entertainments, and the like, have been suggested. The AR technology can be applied to all the sense organs, such as sense of sight, auditory sense, tactile sense, sense of taste, sense of smell, and the like; however, in reality, most AR systems are concentrated on the sense of sight.

On the other hand, a haptic technology can further immerse to the users in AR regions and perform the interactive operations along with the sense of feel. The haptic technology is to provide a variety of information on the virtual or real environment to the users through kinesthetic and tactile. The word "haptic" means tactile sense in Greek and is a concept including both kinesthetic and tactile. Unlike other senses, the haptic has an interactive feature that can perform the operation along with the feeling. Therefore, in order to increase the immersion for users of a vision-based augmented reality system, an attempt to unite an acoustic effect and a haptic device 150 has been recently made.

FIG. 1 is a diagram showing one example of a vision-based augmented reality system using an AR marker and a haptic device.

As shown in FIG. 1, a vision-based augmented reality system 100 includes AR markers 110, an image capturing device 120, a main processing device 130, a visual display device 140, and a haptic device 150.

The AR markers 110 can be displayed in predetermined patterns. One AR marker 110 is established to correspond to one virtual object. The markers 110 used in the virtual reality may be two-dimensional or three-dimensional images in addition to the AR markers 110 having the predetermined patterns.

The image capturing device 120 performs a function of capturing images for a real environment in addition to the AR markers 110. As a representative example, there may be a camera.

The main processing device processes images input from the image capturing device 120, recognizes the AR markers 110 among the input images, and produces virtual objects corresponding to the AR markers 110.

The visual display device 140 visually outputs images that are processed in the main processing device. At this time, the visual display device 140 outputs the images of the virtual objects corresponding to the AR markers 110 as two dimensional or three-dimensional images together with the images for the real environment.

The haptic device 150 performs haptic interaction with the virtual objects of the virtual environment. At this time, the haptic device provides reaction force according to the collision with the virtual objects to users and enables the users to operate the virtual objects.

The operation of the vision-based augmented reality system will be described. If the image capturing device 120 receives the images for the real environment in addition to the AR markers 110, the main processing device outputs the input images to the visual display device 140. At this time, the main processing device produces virtual objects corresponding to the AR markers 110 and output the real images and the virtual objects to the visual display device 140. Meanwhile, the main processing device detects whether end points (or haptic interaction points) of the haptic device 150 collide with the virtual objects and when the end points collide with the virtual objects, calculates reaction force and transfers the signal of the calculated reaction force to the haptic device 150, such that the users can feel the reaction force.

The vision-based augmented reality method augments virtual objects in live images captured from the image capturing device. However, there is a problem in that the virtual objects virtually tremble due to a tracking noise of the marker that is a reference. Further, when the users perform haptic interaction with the virtual objects, the noise can cause a trembling of force or unstable haptic interaction. Also, since the coordinates of the image capturing device are different from the coordinates of the haptic environment, in order to provide realistic haptic interaction, each coordinate system should be united. Further, when the virtual objects registered on the marker, which are reference points, slightly move rapidly, the estimated moving distance may be discontinuous between frames. This disparity can be tolerable in terms of the visual aspect, but may be very important problem to solve in terms of haptic interaction. The information can be sufficiently and stably transferred when the frame is refreshed for about every 30 Hz in terms of the image rendering, but stable haptic interaction can be performed only when the frame is refreshed for each 1 kHz in terms of haptic rendering.

Therefore, a need exists for a method that can minimize noise in the marker tracking, conform the coordinates of the images to the coordinates of the haptic, and achieve smooth haptic interaction.

SUMMARY OF THE INVENTION

The present invention proposes to solve the above problems. It is an object of the present invention to provide a method and system for haptic interaction in augmented reality that can effectively remove noise from real images captured by an image capturing device and minimize discontinuity of force generated upon performing haptic interaction in order to stably and smoothly perform the haptic interaction in the augmented reality.

In order to solve the above problems, the present invention provides an augmented reality system including haptic interaction, the augmented reality system comprising: a marker detecting unit that receives images for a real environment including markers and detects the markers included in the images; a marker position extracting unit that extracts the positions of the detected markers; a noise removing unit that removes noise from positional information of the markers extracted from the marker position extracting unit; a visual rendering unit including a virtual object augmenting unit that augments virtual objects corresponding to the markers and outputs them to the positions of the markers; a motion estimating unit that estimates the motion of the markers over a time step so as to perform haptic rendering on the basis of the positional information of the markers transferred from the noise removing unit; a collision detecting unit that detects whether the virtual objects corresponding to the positions of the markers estimated by the motion estimating unit collide with end points of the haptic device; a haptic rendering unit including reaction force calculating unit that calculates reaction force to be provided through the haptic device according to a determination of the collision detecting unit.

Preferably, the positional information of the marker includes the three-dimensional positional information and orientation information of the marker.

Meanwhile, the noise removing unit is configured of any one of a low pass filter, an FIR filter, and an IIR filter or a filter equivalent thereto or is configured of any one of a least square estimator, a minimum mean squared estimator, a maximum likelihood estimator, a maximum A posteriori estimator, Bayes estimator, Kalman filter, a particle filter, a Markov chain Monte Carlo estimator, a minimum variance unbiased estimator, and a best linear unbiased estimator or an estimator equivalent thereto, such that it can simultaneously perform noise removal and motion estimation of the markers.

Preferably, the noise removing unit is implemented by an extended Kalman filter that filters and expects the noise from the positional information of the marker by continuously estimating and correcting the noise from the initial value.

The extended Kalman filter estimates a priori estimate of the state vector and a priori estimate of error covariance from initial conditions and then obtains a Kalman gain and obtains a posteriori estimate of the state vector by correcting the priori estimate of the state vector using the actually measured values and the Kalman gain.

The motion estimating unit estimates the motion of the marker by an adaptive extrapolation method that determines the increment of position of the marker for the haptic rendering after a current time based on the difference between the position of the marker, which is finally estimated by applying the extrapolation method based on the previous time image, and the actual position of the marker in a current time image.

Any one of the visual rendering unit and the haptic rendering unit further includes a coordinate synchronizing unit that performs the synchronization of visual coordinates for the visual rendering and haptic coordinates for the haptic rendering.

According to another aspect of the present invention, there is provided a method for providing augmented reality including haptic interaction, comprising: (a) receiving images for a real environment including markers; (b) detecting the markers in the images and extracting the positions of the detected markers; (c) removing noise included in the positional information of the makers; (d) estimating the motion of the markers over a time step so as to perform the haptic rendering on the basis of the positional information of the markers; (e) detecting whether the virtual objects corresponding to the markers collide with end points of the haptic device, calculating reaction force and outputting it to the haptic device; and (f) augmenting the virtual objects at the marker positions for the real images and outputting them to the visual display.

Preferably, the step (c) includes: (c1) estimating a priori estimate for a state vector including position, velocity, and acceleration of the marker and a priori estimate of error covariance from initial conditions; and (c2) obtaining a Kalman gain and obtaining a posteriori estimate of the state vector by correcting the priori estimate of the state vector using the actually measured values and the Kalman gain.

Preferably, the step d) estimates the motion of the marker by an adaptive extrapolation method that determines the increment of position of the marker for the haptic rendering after a current time based on the difference between the position of the marker, which is finally estimated by applying the extrapolation method based on the previous time image, and the actual position of the marker in a current time image.

With the present invention, the augmented reality system including haptic interaction can minimize the noise of the positions and the orientation information of the markers in the real images, making it possible to more smoothly and stably perform haptic interaction.

With the present invention, upon performing haptic rendering for the haptic interaction, in estimating the positional information of the marker over a time step for haptic rendering, the delay between the visual display and the haptic display is minimized and the positional information of the marker for the virtual objects is effectively estimated, making it possible to minimize the reaction force jerk that can be caused at the time of performing haptic interaction.

BRIEF DESCRIPTION OF THE DRAWINGS

FIG. 1 is a diagram showing one example of a vision-based augmented reality system using an AR marker and a haptic device;

FIG. 2 is a block diagram of an augmented reality system including haptic interaction according to a preferred embodiment of the present invention;

FIG. 3 is a diagram showing a discontinuous reaction force feedback due to the disparity of a refresh rate between a haptic frame and an image frame;

FIG. 4 is a diagram showing a jerk in a reaction force feedback by a conventional interpolation method;

FIG. 5 is a diagram showing a jerk in a reaction force feedback by an extrapolation method in the related art;

FIG. 6 is a diagram for explaining an adaptive extrapolation method according to a preferred embodiment of the present invention;

FIG. 7 is a flow chart showing an augmented reality providing method including haptic interaction according to a preferred embodiment of the present invention; and FIG. 8 is a diagram for explaining a difference between visual display coordinates and haptic coordinates and coordinates transformation for synchronization therebetween in an augmented reality system.

DETAILED DESCRIPTION OF THE PREFERRED EMBODIMENTS

Hereinafter, the preferred embodiments of the present invention will be described in detail with reference to the accompanying drawings. First, when adding reference numerals into constituents in the respective drawings, the same constituents have the same reference numerals, if possible, even though the reference numerals are indicated in other drawings. Also, when explaining the present invention, if it is determined that the specific explanation on the related well-known constitution or function may make the gist of the present invention obscure, the detailed explanation thereof will be omitted. Also, although the preferred embodiments of the present invention will be described, the technical idea of the present invention should not be construed as limited to the embodiments set forth herein but may be embodied in different forms so that the present invention can be easily carried out by those skilled in the art.

FIG. 2 is a block diagram of an augmented reality system that includes haptic interaction according to a preferred embodiment of the present invention.

The augmented reality system 200 according to the preferred embodiment of the present invention includes a visual rendering unit 210 that visually augments virtual objects 202 corresponding to markers 110 based on images input from an image capturing device 120 that photographs a real environment including the markers 110 and output the virtual objects 202 to a visual display device 140, and haptic rendering unit 260 that allows a haptic interaction between the virtual objects 202 and a haptic device 150 to be performed.

The image capturing device 120 performs a function to capture images of the real environment including the markers 110. The markers 110 function as a media for displaying the virtual objects 202 in the augmented reality systems 200, wherein AR markers 110 having predetermined patterns may be used but not limited thereto. It is the most convenient method to use the AR markers, however, the predetermined images in the real environment can function as markers and in this case, 3D images or objects existing in real spaces may also function as markers.

The visual rendering unit 210 detects the markers 110 from the images captured by the image capturing device 120, confirms the positions and orientation of the markers 110 in the real environment and then augments virtual objects 220 corresponding to the markers 110 on the images for the real environment to be output as a visual display device. In the present invention, the visual rendering unit 210 removes noise included in the images captured by the image capturing device 120 and estimates the motions of the markers 110, making it possible to perform the more stable visual display and haptic display.

Meanwhile, the haptic rendering unit 260 performs a function to perform a haptic interaction between the virtual objects 202 corresponding to the markers 110 and the haptic device 150 based on the images of the real environment including the markers 110 processed in the visual rendering unit 210. To this end, the haptic rendering unit 260 detects whether the virtual objects 202 corresponding to the markers 110 collide with the end points of the haptic device 150, and performs a function to calculate reaction force when the collision occurs. In particular, in the present invention, in order to solve the difference of a refresh rate between the image frames and the haptic frames, the haptic rendering unit 260 applies an adaptive extrapolation method when estimating the positions of the markers 110 on the image frames, thereby minimizing the delay in the image and the discontinuity in the reaction force.

The specific configuration of the visual rendering unit 210 and the haptic rendering unit 260 are described as follows.

The visual rendering unit 210 includes a marker detecting unit 220, a marker position extracting unit 230, a noise removing unit 240, and a virtual object augmenting unit 250.

The marker detecting unit 220 detects the markers 110 from the images input by the image capturing device 120. The marker detecting unit 220 may be implemented using a software library such as ARToolkitPlus(http://studierstube.icg.tu-graz.ac.at) that allows the physical markers 110 to function as an image based maker tracking.

The marker position extracting unit 230 detects the markers 110 from the marker detecting unit 220 and then calculates the positions and orientation of the detected markers 110. The virtual objects are augmented on the positions of the markers in the real environment according to the special positions and orientation occupied by the markers 110. To this end, the marker position extracting unit 230 calculates which orientation the maker 110 spatially has (for example, how the maker 110 is slanted in respects to the horizontal direction or the vertical direction) together with the positions of the markers 110

The noise removing unit 240 removes noise included in the information on the positions and orientation of the markers 110 calculated in the marker position extracting unit 230. The noise removing unit 240 removes a trembling of the virtual objects that is augmented by noise inevitably generated when tracking the image based marker. Meanwhile, the noise generated while tracking the markers 110 has been acknowledged by P. Malbezin, etc. (P. Malbezin, W. Piekarski, and B. H. Thomas, "Measuring ARToolKit Accuracy in Long Distance Tracking Experiments", Conf. Proc. IEEE Augmented Reality Toolkit Workshop, pp. 28-29, 2001). Also, the noise removing unit 240 estimates the positions and orientation of the markers 110 for a smooth haptic interaction. Such a noise removing unit 240 may be implemented as an Extended Kalman Filter (EKF) to be described later.

The virtual object augmenting unit 250 augments the virtual objects corresponding to the markers 110 on the images for the real environment based on the information on the positions and orientation of the markers 110 whose noise is removed by the noise removing unit 240 to output the virtual objects to the visual display device. When outputting the virtual objects to a live image captured by the image capturing device 120, the virtual object augmenting unit 250 can render the virtual objects using a Vertex Buffer Object (VBO) of OpenGl among rendering methods of various virtual objects as a preferred embodiment. The VBO transmits buffer data to a video memory, thereby making the speed of the visual rendering of the virtual objects fast.

The haptic rendering unit 260 includes a motion estimating unit 270, a collision detecting unit 280 and a reaction force calculating unit 290.

In order to perform haptic rendering, the motion estimating unit 270 estimates the motions of the markers according to the refresh rate of the haptic rendering, that is, the positions and orientation of the markers, based on the information on the positions and orientation of the markers transferred from the noise removing part 240. The motion estimation method of the markers of such a motion estimating unit 270 may be performed using an interpolation method or an extrapolation method, more preferably, using an adaptive extrapolation method to be described later in the present invention.

The collision detecting unit 280 detects whether the virtual objects 202, which are augmented corresponding to the markers 110, collide with the end points of the haptic device 150. Such collision detection may be performed depending on whether the end points of the haptic device 150 or a Haptic Interaction Point (HIP) in the virtual space collide with the virtual objects.

The reaction calculating part 290 calculates proper reaction force when the end points of the haptic device 150 collide with the virtual objects to transfer the reaction force to the haptic device 150.

The main characteristics of the augmented reality system according to the present invention as described above may be recognized as the noise removing unit 240 and the motion estimating unit 270. Hereinafter, the operations of the noise removing unit 240 and the motion estimating unit 270 will be described in more detail.

As described above, the noise removing unit 240 minimizes the noise and estimates the motions of the markers 110 in order to remove the trembling or instability of force occurred due to the visual trembling of the virtual objects and haptic interaction that are generated by the noise generated from the vision based marker tracking.

The noise removing unit 240 may be implemented using a low pass filter, a finite response impulse (FIR) filter, an infinite impulse response (IIR) filter, all of which remove noise.

However, although these filters are relatively advantageous in removing noise, they lead to a delay in time and are insufficient in removing instability generated during the haptic interaction by estimating the motions of the markers. Therefore, the noise removing unit 240 is more preferably configured to estimate the motions of the markers as well as to remove the noise.

To this end, the noise removing unit 240 may use the following estimation methods in order to remove the noise simultaneously with estimating the motions.

1) Least Square Estimator (MSE): An estimator that minimizes the sum of square errors using a method to minimize errors between a system model and estimated data 2) Minimum Mean Squared Estimator (MMSE): An estimator that finds an optimal solution by minimizing the average of square errors using a method to minimize errors of an interesting parameter.

3) Maximum Likelihood Estimator (MLE): An estimator that estimates maximum likelihood, that is, an estimator that finds optimal parameters to maximize possibility that the values observed by maximizing a likelihood function are obtained on the assumption that the parameters are fixed although their accurate values are not known.

4) Maximum a Posterior (MAP): MAP is similar to the MLE, but is different from the MLE that considers prior probability. This estimator sets a posterior probability and estimates an optimal parameter based thereon.

5) Bayes estimator: In the MLE, the parameters are considered as fixed values. However, in the Bayes estimation method, the parameters are considered as random variables and the distribution of the random variables is converted into a posterior probability density through an analysis of material groups to obtain posterior probabilities, thereby estimating the parameters therethrough.

6) Kalman filter: When there are measurement data mixed with noise, assuming that the noise is white Gaussian noise, Kalman filter allows the values measured by setting a mode and a measurement model of a system that generates such a noise to find an optimal value, while repeatedly performing the steps of pre estimation and correction. The Kalman filter, which is the most effective filter that can be applied to a linear system including a time change, non-stationary, a multi-channel system, has been widely used in a real-time processing and has been also widely used in filtering artificial satellite navigational materials.

7) Particle filter: Particle filter, which has been known as Sequential Monte Carlo (SMC) method, is based on a simulation. This estimator estimates an optimal parameter by finding a sequence of unknown parameters based on the measured data. This method provides a strong estimation method to be widely used in an application such as a real-time trace, in the same manner as the Kalman filter. In particular, if the number of particles (samples) is a few, an accurate estimation result can be obtained.

8) Markov chain Monte Carlo (MCMC): It is the sort of algorithm that extracts a sample having a desired static distribution from a probability distribution based on the constitution of Markov chain. The MCMC is typically used in approximating a target distribution, wherein the most general application of the algorithm is to calculate a multidimensional integration 9) Minimum Variance Unbiased Estimator (MVUE): An estimator that provides an estimator having the smallest distribution among estimators that satisfy unbiasness.

10) Best Linear Unbiased Estimator (BLUE): An estimator that minimizes unbiased estimator among the unbiased estimators represented by a linear combination of measurement values in a Linear Regression Model according to the Gauss-Markov theorem.

Among various estimation methods as above, the removal of noise and the estimation of motions using an Extended Kalman Filter will be described in the present embodiment by way of example.

The Extended Kalman Filter may be appreciated as a non-linear shape of the Kalman filter that can be applied to an nonlinear model as well as a linear model. The Kalman filter may be considered as a statistic estimation process when noise is filtered in the measured data through a continuous estimation and correction. The Extended Kalman Filter applies such a linear Kalman filter to nonlinear system. At this time, the system to be measured in the Extended Kalman Filter should be described in a linear system that can use the Extended Kalman Filter in order to remove noise from the signal. In the Extended Kalmn filter, the general forms of the system model and the measurement model may be represented by the following Equation 1.

$$x_{k+1} = F_k x_k + w_k$$

$$y_k = H_k x_k + v_k \qquad \text{[Equation 1]}$$

In Equation 1, $x_{k+1}$ and $x_k$ represent state vectors in time k+1 and k, and $y_k$ represents a measurement vector in time k. Also, $F_k$ and $H_k$ represent coefficients that determine features of a system model and a measurement model, respectively, in time k, and $w_k$ and $v_k$ represent a system noise and a measurement noise, respectively. The vision based marker tracking system is a nonlinear dynamical system where the positions and orientation of the virtual objects augmented by the motions of users who hold the physical markers are continuously changed over a time step, wherein the Extended Kalman Filter can be applied thereto through a linearization process using secondary Taylor series. Therefore, the vision based marker tracking system can be linearized using the secondary Taylor series, as presented by the following Equation 2.

$$\hat{x}_{k+1} \equiv \hat{x}_k + \Delta t \dot{\hat{x}}_k + \frac{1}{2}\Delta t^2 \ddot{x}_k \qquad \text{[Equation 2]}$$

Using the state space description, the system model may be represented by the following Equation 3.

$$\begin{bmatrix} x_{k+1} \\ \dot{x}_{k+1} \\ \ddot{x}_{k+1} \end{bmatrix} = \begin{bmatrix} 1 & \Delta t & \Delta t^2/2 \\ 0 & 1 & \Delta t \\ 0 & 0 & 1 \end{bmatrix} \begin{bmatrix} x_{k+1} \\ \dot{x}_{k+1} \\ \ddot{x}_{k+1} \end{bmatrix} + \begin{bmatrix} w_1(k) \\ w_2(k) \\ w_3(k) \end{bmatrix} \qquad \text{[Equation 3]}$$

Considering the three-dimensional positions and orientation, the system model such as Equation 3 that is drawn for a three-dimensional marker tracking may be generalized by the following Equation 4.

$$x_{k+1} = F_k x_k + w_k \quad \text{[Equation 4]}$$

In Equation 4, the state vector x represents 3×6 dimensions consisting of three positions and angle components, three velocity and angular velocity components, and three acceleration and angular acceleration components, $w_k$ represents system noise flowed into the system due to uncertainty in the position, velocity, acceleration, angle, angular velocity, and angular acceleration. The noise has average of 0 (zero mean) and may be appreciated as having irrelative random value $w_k \sim N(0, Q_k)$.

For the filtering process, the marker conversion matrix positions and orientation are measured. Using such data, the velocity, acceleration, angular velocity, and angular acceleration of the mark can be extracted.

Therefore, the measurement model of the system may be represented by the following Equation 5.

$$y_k = H_k x_k + v_k = [1\ 1\ 1] x_k + v_k \quad \text{[Equation 5]}$$

In Equation 5, $v_k$ represents measurement noise due to uncertainty in the position, velocity, acceleration, angle, angular velocity, and angular acceleration. The measurement noise has average of 0 (zero mean) and may be appreciated as having irrelative random value $v_k \sim N(0, R_k)$.

The continuous refreshing process of the Extended Kalman Filter is as follows.

Initial Condition

The Extended Kalman Filter is initialized as estimation X0 and uncertainty P0 in a posterior state in an original step 0.

$$\bar{x}_0 \sim N(x_0, P_0), \bar{x}_0 = E(x_0), P_0 = cov(x_0)$$

Estimation

In each step, the Extended Kalman Filter calculates estimates for the system state and uncertainty in the current step to the previous step using the following Equations 6 and 7.

$$\hat{x}_{k/k-1} = F_k \hat{x}_{k-1/k-1}, \hat{x}_{0/0} = \bar{x}_0 \quad \text{[Equation 6]}$$

$$P_{k/k-1} = F_k P_{k-1/k-1} F_k^T + w_k Q_{k-1} w_k^T, P_{0/0} = P_0 \quad \text{[Equation 7]}$$

In Equations 6 and 7, $\hat{x}_{k/k-1}$ represents priori estimate of the state vector, and $P_{k/k-1}$ represents priori estimate of error covariance.

Correction

The Extended Kalman Filter corrects the estimate in the previous state as measurement value $y_k$ using the following correction equation. The correction equation is as follows.

A Kalman gain $K_k$ may be represented by the following Equation 8, a posteriori estimate error covariance $P_{k/k}$ may be represented by the following Equation 9, and a posteriori estimate $\hat{x}_{k/k}$ of the state vector may be represented by the following Equation 10.

$$K_k = P_{k/k-1} H_k^T [H_k P_{k/k-1} H_k^T + R_k]^{-1} \quad \text{[Equation 8]}$$

$$P_{k/k} = (I - K_k H_k) P_{k/k-1} \quad \text{[Equation 9]}$$

$$\hat{x}_{k/k} = \hat{x}_{k/k-1} + K_k (y_k - H_k \hat{x}_{k/k-1}) \quad \text{[Equation 10]}$$

As shown in the above description on the Extended Kalman Filter, effect of noise such as $R_k$ determines the entire performance of the Extended Kalman Filter. Therefore, when actually implementing the Extended Kalman Filter, a measurement noise covariance $R_k$ is commonly measured before the filter is operated.

In order to measure the measurement noise covariance $R_k$, the positions and orientation of the markers 110 may be first calculated by the following Equation 11 using the marker conversion matrix.

$$T_{MARKER} = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix} \quad \text{[Equation 11]}$$

$$= \begin{bmatrix} R_{3\times3} & T_{3\times1} \\ 0 & 1 \end{bmatrix}$$

In Equation 11, $R_{3\times3}$ and $T_{3\times1}$ represent a rotation matrix and a translation matrix on a finger tip, respectively. $T_{3\times1}$ vector is used in measuring the position errors of the object. When measuring the orientation errors of the objects, a rotation change is divided into three continuous rotations to a world coordinate and this may be represented by the following Equation 12.

$$R_{3\times3} = R_\phi R_\theta R_\Psi \quad \text{[Equation 12]}$$

$$= \begin{bmatrix} C_\phi C_\theta & -S_\phi C_\Psi + C_\phi S_\theta S_\Psi & S_\phi S_\Psi + C_\phi S_\theta S_\Psi \\ S_\phi C_\theta & C_\phi C_\Psi + S_\phi S_\theta S_\Psi & -C_\phi S_\Psi + S_\phi S_\theta C_\Psi \\ -S_\theta & C_\theta S_\Psi & C_\theta C_\Psi \end{bmatrix}$$

In Equation 12, C and S represent cosine and sine, respectively, and $\psi$, $\theta$ and $\phi$ represent rotation angle to x, y and z axes of the world coordinate. Compared with the rotation matrix in Equations 11 and 12, the rotation angle to the respective axes may be determined by the following Equation 13.

$$\Psi = \sin^{-1} \frac{R_{32}}{\cos\theta}, \quad \text{[Equation 13]}$$

$$\theta = -\sin^{-1}(R_{31}),$$

$$\phi = \sin^{-1} \frac{R_{21}}{\cos\theta}$$

The results that the noise covariance $R_k$ is measured for an offline sample in the manner as described above are shown by the following tables 1 and 2. Table 1 shows noise errors (displayed in mm) according to the real distance between the markers and cameras in terms of the position, velocity and acceleration. Table 2 shows noise errors according to different angles between the markers and the cameras in terms of the angle, angular velocity and angular acceleration.

TABLE 1

| | x, y, z | | $\dot{x}, \dot{y}, \dot{z}$ | | $\ddot{x}, \ddot{y}, \ddot{z}$ | |
|---|---|---|---|---|---|---|
| | Variance | Range | Variance | Range | Variance | Range |
| 20 cm | 0.00006 | 1.0459 | $1 \times 10^{-6}$ | 0.0921 | $2 \times 10^{-10}$ | 0.00209 |
| 30 cm | 0.00192 | 2.3063 | $2 \times 10^{-6}$ | 0.2081 | $2 \times 10^{-9}$ | 0.00424 |
| 40 cm | 0.00536 | 4.4628 | $7 \times 10^{-6}$ | 0.3209 | $1 \times 10^{-8}$ | 0.00528 |
| 50 cm | 0.03352 | 5.1093 | $2.5 \times 10^{-5}$ | 0.4312 | $3 \times 10^{-8}$ | 0.00873 |
| 60 cm | 0.25838 | 5.5409 | 0.00019 | 0.4989 | $3 \times 10^{-7}$ | 0.01276 |
| 70 cm | 2.09567 | 6.3756 | 0.00287 | 0.5406 | $3 \times 10^{-6}$ | 0.02749 |

TABLE 2

| | $\psi, \theta, \phi$ | | $\dot{\psi}, \dot{\theta}, \dot{\phi}$ | | $\ddot{\psi}, \ddot{\theta}, \ddot{\phi}$ | |
|---|---|---|---|---|---|---|
| | Variance | Range | Variance | Range | Variance | Range |
| 0° | 1.82033 | 8.88153 | 0.0017 | 0.7553 | $3 \times 10^{-6}$ | 0.06411 |
| 15° | 0.46309 | 4.17513 | 0.0007 | 0.4763 | $8 \times 10^{-7}$ | 0.03493 |
| 30° | 0.11154 | 2.01992 | 0.0002 | 0.2783 | $1 \times 10^{-7}$ | 0.02231 |
| 45° | 0.02227 | 1.84214 | 0.00004 | 0.1454 | $4 \times 10^{-8}$ | 0.00928 |
| 60° | 0.00543 | 2.57839 | $8 \times 10^{-6}$ | 0.2189 | $9 \times 10^{-9}$ | 0.02058 |
| 75° | 0.00025 | 3.11273 | $3 \times 10^{-7}$ | 0.4046 | $4 \times 10^{-10}$ | 0.02912 |

Reviewing the results in Tables 1 and 2, it is appreciated that the noise for the position, velocity and acceleration is increased as the distance is increased, and the noise for the angle, angular velocity and angular acceleration is increased as the noise is closer to 0° where the cameras directly face the markers or 90° were the cameras faces the markers in parallel. Based on the noise analysis results as described above, the noise covariance $R_k$ may select and apply maximum value from Tables 1 and 2 by way of example and proper noise values may be selected according to the real environment.

Next, the specific function of the motion estimating unit 270 in the haptic rendering unit 260 will be described.

The image rendering is commonly refreshed for every about 30 Hz, whereas the haptic rendering should be refreshed for every about 1 khz, which can provide a comfortable haptic interaction to the users. However, in the haptic rendering performed based on the images, there may occur a problem in that due to the difference between the refresh rates, the reaction force is abruptly changed at the moment that the image frame is changed. KR Patent 761022 (Haptic Rendering Method Based on Depth Image, Device therefor, and Haptic Broadcasting System using Them) tried to solve the above problem using an interpolation method. However, in actual, the refresh rate between the image frame and the haptic frame is not constant and has slight errors, which still causes the discontinuous force. The fluctuation in the refresh rate may be further augmented when the augmented virtual objects is touched by the haptic device 150.

When the users interact with the virtual objects by using the haptic device 150, the problems in calculating the feedback reaction force will be described in more detail below.

FIG. 3 is a diagram showing the discontinuous reaction force feedback due to the disparity of the refresh rate between the haptic frame and the image frame. FIG. 4 is a diagram showing the jerk in the reaction force due to the interpolation method according to the related art. FIG. 5 is a diagram showing the jerk in the reaction force feedback by the extrapolation method according to the related art.

In FIGS. 3 to 5, reference numeral '300' represents the virtual objects in the virtual environment and is to display which the virtual objects are positioned in the virtual environment in any state.

Referring to FIG. 3, when the virtual object 300 move from a previous position to a next position, there is no an intermediate point for calculating the reaction force, such that the user feels the abrupt change in the reaction force upon interacting with the virtual object 300 using the haptic device 150 (see reaction force within a dotted-line circular arc).

Referring to FIG. 4, it can appreciate the problems when the collision detection and the reaction force calculation are performed by the interpolation method. The interpolation method interpolates and determines the positions of the virtual objects 300 in each haptic frame by dividing the refresh time of the current position and the previous position of the image frame by the haptic frame refresh rate and detects the presence or absence of the collision with the action point of the haptic device 150. However, in order to apply the interpolation method, since at least one image frame should be previously stored in the buffer, the time delay occurs at the time of calculating the haptic feedback. Further, since the image refresh rate and the haptic refresh rate is fluctuated over a time step, when the interpolated position of the virtual object 300 compares with the position of the actual virtual position 300, there may be a difference therebetween.

FIG. 4(a) shows a case where the users feel a forward jerk since there is a relatively large distance difference between the interpolated position and the position of the current, actual virtual object of the virtual object 300. FIG. 4(b) shows a case where the users feel a backward jerk since the interpolated position of the virtual object 300 passes by the position of the current, actual virtual object 300.

In addition to the problems mentioned in FIG. 4, the augmented reality system to which the present invention is applied can be extended to multi modal application programs for providing a variety of information, such as images, voices, haptic. As a result, the interference between the plurality of application programs occurs and the calculation increases, the above problems may be more serious.

Unlike the above interpolation method, in the case of the extrapolation method performs the haptic rendering by estimating the positions of the virtual objects 300 after the current position using the time step between the virtual object 300 of the previous position and the virtual object 300 of the current position. Unlike the interpolation method, the extrapolation method does not cause the problem in delaying the images. However, likewise the interpolation method, the extrapolation method may still cause the forward jerk or the backward jerk due to the fluctuation of the image refresh rate and the haptic refresh rate.

Referring to FIG. 5, similarly to the case of FIG. 4, it can be appreciated that the forward jerk (case of a) or the backward jerk (case of b) occurs even in the case of the extrapolation method.

As a method to solve the above problems, the present invention suggested the adaptive extrapolation method capable of minimizing the discontinuity of the reaction force.

FIG. 6 is a diagram for explaining the adaptive extrapolation method according to the preferred embodiment of the present invention. FIG. 6(a) is a diagram for explaining the removal of the forward jerk and FIG. 6(b) is a diagram for explaining the removal of the backward jerk.

In FIG. 6, $t_v$ and $t_h$ represents the time steps for the image rendering and the haptic rendering and $T_{t-\Delta t}$, $T_t$, and $T_{t+\Box t}$ and $R_{t-\Delta t}$, $R_t$, and $R_{t+\Box t}$ each represents the previous, current, and future positions and rotating angles of the virtual objects 300. $LEP_{t-\Delta t}$ represents a position that is finally estimated by the extrapolation method in the previous time step and $\delta T$ and $\delta R$ represents the distance and angle differences between the $LEP_{t-\Delta t}$ and the current position of the virtual object 300. These relationships may be represented by the following Equation 14.

$$\delta T = T_t - T_{LEP_{t-M}}$$

$$\delta R = R_t - R_{LEP_{t-M}} \qquad \text{[Equation 14]}$$

In Equation 14, $T_{LEP_{t-m}}$ and $R_{LEP_{t-M}}$ represent the positions and rotating angles at the finally estimated point that is calculated at the previous time step.

In applying the adaptive extrapolation method, the $LEP_{t-\Delta t}$ is continuously monitored for every image frame. If there is the difference between the $LEP_{t-\Delta t}$ and the current virtual position, in order to calculate the increments for applying the extrapolation method later, δT and δR are considered.

Therefore, in the haptic rendering, the increments for the positions and angles of the virtual objects 300 may be determined by the following Equation 15.

$$\Delta T = (T_t - T_{t-\Delta t} + \delta T) \times t_h/t_v \quad \text{[Equation 15]}$$
$$= (2T_t - T_{t-\Delta t} - T_{LEP_{t-\Delta t}}) \times t_h/t_v$$
$$\Delta R = (R_t - R_{t-\Delta t} + \delta R) \times t_h/t_v$$
$$= (2R_t - R_{t-\Delta t} - R_{LEP_{t-\Delta t}}) \times t_h/t_v$$

The motion estimating unit 270 estimates the positions of the virtual objects so as to calculate the collision detection and the reaction force by the above-mentioned methods such that the positions of the estimated virtual objects conforms the positions of the virtual objects in the real image frames and the jerk, which can be caused by refreshing the image frames, can be minimized.

The method for providing the augmented reality including the haptic interaction using the above-mentioned augmented reality system will be described below.

FIG. 7 is a flow chart showing the method for providing the augmented reality including the haptic interaction.

In order to provide the augmented reality, the images of the real environment including the markers 110 are received through the image capturing device 120 (S700).

The marker detecting unit 220 of the image capturing device detects the markers 110 from the images for the real environment (S702).

Next, the marker position extracting unit 230 confirms which the markers 110 are positioned and extracts the positions and orientation of the markers 110 (S704).

Since the information on the positions and orientation of the markers 110 may include noise caused due to various environmental factors in addition to the noise caused from the image capturing device 120, the noise removing unit 240 removes the noise from the position and orientation information of the marker 110 and preferably, continuously estimates the position and orientation information of the markers 110 (S706). The position and orientation information of the markers in which the noise is removed is used for the augmentation of the virtual objects 202 and the interaction of the virtual objects 202 and the haptic device 150.

The virtual object augmenting unit 250 augments the virtual objects 202 at the positions of the markers 110 in the real environment and transfers them to the visual display device 140 (S708) and the visual display device 140 visually outputs the augmented virtual objects (S710).

Meanwhile, the noise removing unit 240 transfers the position and orientation information of the markers 110 in which the noise is removed to the haptic rendering unit 260 and the motion estimating unit 270 of the haptic rendering unit 260 estimates the motions of the markers 110 according to the time step for the haptic rendering so as to perform the haptic rendering (S712). In the present invention, the motion estimating unit 270 estimates the motions of the markers 110 by the adaptive extrapolation method, thereby making it possible to remove the reaction force jerk that can be caused upon refreshing the new image frames.

The collision detecting unit 280 detects whether the virtual objects 202 augmented corresponding to the positions of the markers 110 estimated by the motion estimating unit 270 collide with the end point's of the haptic device 150 (S714).

The reaction force calculating unit 290 calculates the reaction force when the virtual objects 202 collide with the end points of the haptic device 150 and transfers the calculated reaction force to the haptic device 150 (S716) and the haptic device 150 provides the reaction force to the users (S718).

Meanwhile, in the augmented reality system, the augmentation of the virtual objects and the captured images are visually rendered by using the marker conversion matrix and the camera projection matrix based on the OpenGL. However, the visually rendered real environment and the images for the virtual objects generally have the coordinates in a state different from the coordinates of the real environment, that is, an opposite direction. For example, when the pinhole camera is used as the image capturing device, the images are focused on the image plane inside the camera and the coordinates therefor is the same as the state that rotates the coordinates of the real environment by 180°. The disparity of the coordinates serves as factors that hinder the accurate haptic interaction of the users and the virtual objects.

FIG. 8 is a diagram for explaining a difference between the visual displays coordinates and the haptic coordinates and the coordinate transformation for synchronization therebetween in the augmented reality system.

In order to solve the disparity of the coordinates at the time of performing the visual rendering and the haptic rendering, the coordinates for the images should be rotated so that they conforms to the coordinates for the haptic rendering. The rotation may be performed using the marker conversion matrix. The marker conversion matrix converts the virtual objects 202 corresponding to the markers 110 so that the virtual objects 202 are augmented at the positions of the markers 110 of the images for the real environment. Accordingly, transforming the coordinates used at the time of performing the visual rendering by using the coordinate synchronization matrix ($T'_{MARKER}$) represented by the following Equation 16 can synchronize the coordinates for the visual rendering with the coordinates for the haptic rendering. In Equation 16, $T'_{MARKER}$ represents the marker conversion matrix.

$$T'_{MARKER} = \text{Rot}_{180°_x} T_{MARKER} \quad \text{[Equation 16]}$$

Accordingly, the augmented reality system according to the preferred embodiment of the present invention shown in FIG. 2 further includes a coordinate synchronizing unit to perform the coordinate transformation as described above, such that the visual coordinates can be synchronized with the haptic coordinates.

Meanwhile, the configuration of synchronizing the visual coordinates with the haptic coordinates by transforming the visual coordinates is described, but in the embodiments of the present invention, the synchronizing of the visual coordinates with the haptic coordinates can be achieved by transforming the haptic coordinates.

As described above, although the present invention has been described with reference to the limited embodiments and accompanying drawings, the present invention is not limited to the embodiments and various changes and modification may be made by those skilled in the art. Therefore, the scope of the present invention should not be limited to the above-described embodiments and should be defined by the appended claims and their equivalents.

What is claimed is:

1. An augmented reality system including haptic interaction, comprising:
   a marker detecting unit that receives images for a real environment including markers and detects the markers included in the images;

a marker position extracting unit that extracts the positions of the detected markers;

a noise removing unit that removes noise from positional information of the markers extracted from the marker position extracting unit;

a visual rendering unit including a virtual object augmenting unit that augments virtual objects corresponding to the markers and outputs them to the positions of the markers;

a motion estimating unit that estimates the motion of the markers over a time step so as to perform a haptic rendering on the basis of the positional information of the markers transferred from the noise removing unit;

a collision detecting unit that detects whether the virtual objects corresponding to the positions of the markers estimated by the motion estimating unit collide with end points of a haptic device; and a haptic rendering unit including a reaction force calculating unit that calculates reaction force to be provided through the haptic device according to a determination of the collision detecting unit;

wherein the motion estimating unit estimates the motion of the marker by an adaptive extrapolation that determines the increment of position of the marker for the haptic rendering after a current time based on the difference between the position of the marker, which is finally estimated by applying the extrapolation method based on the previous time image, and the actual position of the marker in a current time image.

2. The augmented reality system according to claim 1, wherein the positional information of the marker includes three-dimensional positional information and orientation information of the marker.

3. The augmented reality system according to claim 1, wherein the noise removing unit is configured of any one of a low pass filter, an FIR filter, and an IIR filter or a filter equivalent thereto.

4. The augmented reality system according to claim 1, wherein the noise removing unit is configured of any one of a least square estimator (MSE), a minimum mean squared estimator, a maximum likelihood estimator, a maximum A posteriori estimator, Bayes estimator, Kalman filter, a particle filter, a Markov chain Monte Carlo estimator, a minimum variance unbiased estimator, and a best linear unbiased estimator or an estimator equivalent thereto, such that it can simultaneously perform the noise removal and the motion estimation of the markers.

5. The augmented reality system according to claim 1, wherein the noise removing unit is implemented by an extended Kalman filter that filters and expects the noise from the positional information of the marker by continuously estimating and correcting the noise from the initial value.

6. The augmented reality system according to claim 5, wherein in the extended Kalman filter, a model for the marker tracking is represented by a state vector including position, velocity, and acceleration and system noise caused in the tracking process and is continuously estimated based on actually measured values.

7. The augmented reality system according to claim 5 or 6, wherein the extended Kalman filter estimates a priori estimate of the state vector and a priori estimate of error covariance from initial conditions and then obtains a Kalman gain and obtains a posteriori estimate of the state vector by correcting the priori estimate of the state vector using the actually measured values and the Kalman gain.

8. The augmented reality system according to claim 1, wherein the position of the marker, which is finally estimated based on the previous time image, is continuously monitored for every image frame.

9. The augmented reality system according to 1, wherein any one of the visual rendering unit and the haptic rendering unit further includes a coordinate synchronizing unit that synchronizes visual coordinates for the visual rendering with haptic coordinates for the haptic rendering.

10. A method for augmented reality including haptic interaction, comprising:

(a) receiving images for a real environment including markers;

(b) detecting the markers in the images and extracting the positions of the detected markers;

(c) removing noise included in the positional information of the makers;

(d) estimating the motion of the markers over a time step so as to perform the haptic rendering on the basis of the positional information of the markers;

(e) detecting whether the virtual objects corresponding to the markers collide with end points of the haptic device, calculating reaction force and outputting it to the haptic device; and (f) augmenting the virtual objects at the marker positions for the real images and outputting them to the visual display;

wherein the step d) estimates the motion of the marker by an adaptive extrapolation that determines the increment of position of the marker for the haptic rendering after a current time based on the difference between the position of the marker, which is finally estimated by applying the extrapolation method based on the previous time image, and the actual position of the marker in a current time image.

11. The method for augmented reality according to claim 10, wherein the positional information of the marker includes three-dimensional positional information and orientation information of the markers.

12. The method for augmented reality according to claim 10, wherein the step (c) is performed by any one of a low pass filter, an FIR filter, and an IIR filter or a filter equivalent thereto.

13. The method for augmented reality according to claim 10, wherein the step (c) is performed by any one of a least square estimator (MSE), a minimum mean squared estimator, a maximum likelihood estimator, a maximum A posteriori estimator, Bayes estimator, Kalman filter, a particle filter, a Markov chain Monte Carlo estimator, a minimum variance unbiased estimator, and a best linear unbiased estimator or an estimator equivalent thereto, such that it can simultaneously perform the noise removal and the motion estimation of the markers.

14. The method for augmented reality according to claim 10, wherein the step (c) is performed by an extended Kalman filter that filters and expects the noise from the positional information of the marker by continuously estimating and correcting the noise from the initial value.

15. The method for augmented reality according to claim 10, wherein the step (c) includes:

(c1) estimating a priori estimate for a state vector including position, velocity, and acceleration of the marker and a priori estimate of error covariance from initial conditions; and (c2) obtaining a Kalman gain and obtaining a posteriori estimate of the state vector by correcting the priori estimate of the state vector using the actually measured values and the Kalman gain.

16. The method for augmented reality according to claim 10, wherein the position of the marker, which is finally estimated based on the previous time image, is continuously monitored for every image frame.

17. The augmented reality system according to claim 1, wherein the adaptive extrapolation is further based on a ratio between a haptic time step and a graphic time step.

18. The method for augmented reality according to claim 10, wherein the adaptive extrapolation is further based on a ratio between a haptic time step and a graphic time step.

* * * * *